United States Patent
Kahn et al.

(10) Patent No.: US 9,369,916 B2
(45) Date of Patent: Jun. 14, 2016

(54) CONGESTION AND ANALYTICS BASED ACCESS SELECTION CONTROL

(71) Applicant: Alcatel Lucent, Boulogne-Billancourt (FR)

(72) Inventors: Colin L. Kahn, Morris Plains, NJ (US); Harish Viswanathan, Morristown, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 225 days.

(21) Appl. No.: 13/974,395

(22) Filed: Aug. 23, 2013

(65) Prior Publication Data
US 2015/0055470 A1    Feb. 26, 2015

(51) Int. Cl.
*H04W 28/02* (2009.01)
*H04W 48/18* (2009.01)
*H04W 48/08* (2009.01)

(52) U.S. Cl.
CPC .......... *H04W 28/0268* (2013.01); *H04W 48/18* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 2010/0216454 A1* | 8/2010 | Ishida | H04W 72/005 455/424 |
| 2012/0196644 A1* | 8/2012 | Scherzer et al. | 455/524 |
| 2013/0242965 A1* | 9/2013 | Horn et al. | 370/338 |
| 2014/0079022 A1* | 3/2014 | Wang et al. | 370/331 |

FOREIGN PATENT DOCUMENTS

| | | |
|---|---|---|
| EP | 2763465 A2 | 6/2014 |
| WO | 2011100269 A1 | 8/2011 |
| WO | 2013048199 A2 | 4/2013 |

OTHER PUBLICATIONS

Alcatel-Lucent et al, "RAN Parameters for Traffic Steering", 3GPP Draft; R2-140715, WiFi Parameters VO.6, 3rd Generation, vol. RAN WG3, no. Prague, Czech Republic; Feb. 10, 2014-Feb. 14, 2014. Jan. 31, 2014, XP050754300, URL: http://www.3gpp.org/ftp/tsg_ran/WG2_RL2/TSGR2_85/Docs—6 pages.
PCT/US2014/051641—International Search Report—Alcatel-Lucent, Nov. 20, 2014, 4 pages.
PCT/US2014/051641—Written Opinion of the International Searching Authority—Alcatel-Lucent, Nov. 20, 2014, 6 pages.

* cited by examiner

*Primary Examiner* — Awet Haile
(74) *Attorney, Agent, or Firm* — Davidson Sheehan LLP

(57) ABSTRACT

An example method includes obtaining from an Access Network Discovery and Selection (ANDSF) server an ANDSF policy specifying a rule for access selection, the rule specifying one or more attributes to be compared to a corresponding one or more expressions, at least one of the corresponding one or more expressions being a sum of a corresponding threshold parameter and a corresponding offset parameter. The example method further includes obtaining one or more threshold parameter values, obtaining at least one offset parameter value, and determining the access selection based on the at least one rule, the one or more threshold parameter values, and the at least one offset parameter value.

19 Claims, 3 Drawing Sheets

CONGESTION AND ANALYTICS BASED ACCESS SELECTION CONTROL

BACKGROUND

This application relates generally to communication systems, and, more particularly, to load balancing between mobility networks and Wifi networks.

Wireless communication systems provide wireless connectivity to user equipment (UE) using a network of interconnected access nodes and/or base stations. UEs may implement transceivers that include a transmitter for transmitting uplink signals towards the network (reverse link) and a receiver for receiving downlink signals transmitted by the network (forward link). Communication over the air interface between a UE and the access nodes or base stations take place according to various agreed-upon standards and/or protocols. For example, the Third Generation Partnership Project (3GPP, 3GPP2) has specified a set of standards for a packet-switched wireless communication system referred to as Long Term Evolution (LTE). The LTE standards support access schemes including single-carrier frequency division multiple access (SC-FDMA). Multiple users can concurrently access the SC-FDMA network using different sets of non-overlapping Fourier-coefficients or sub-carriers. Wifi networks also allow electronic devices to exchange data and/or connect to the external networks (e.g., the Internet) wirelessly using radio waves. A Wi-Fi network may include any Wireless Local Area Networks (WLAN) products that are based on the Institute of Electrical and Electronics Engineers (IEEE) 802.11 standards.

3GPP has defined an Access Network Discovery and Selection (ANDSF) function that allows mobile network operators to specify policies to UEs on the technology that the UEs should select for service. At the present time, the policy choice is principally between receiving service on the mobility network (e.g., 3GPP) or on one or more Wifi networks. The ANDSF function provides a mechanism for the mobile network operator to specify the conditions under which a UE should select a particular access. An example ANDSF function utilizes Open Mobile Alliance-Device Management (OMA-DM) as a transport mechanism for sending policies to a UE, and as a result, supports only a fairly static set of rules (e.g., policy rules changeable on the order of ~30 min or greater).

ANDSF policies may be based on a combination of analytics information about the subscriber and analytics information about the network (hereinafter subscriber analytics and network analytics). Subscriber analytics may include Quality of Experience metrics, subscriber analysis metrics, wireless service metrics and the like. Quality of Experience (QoE) is a subjective measure of a subscriber's experience with a service. QoE attempts to measure metrics that a subscriber customer will directly perceive as a quality parameter. For example, QoE may indicate whether video stalled during a prior (e.g., last) subscriber Pay Per View (PPV) video session on Wifi, whether the subscriber has been complaining on an online social networking service and/or microblogging service (e.g., Twitter) about the operator Wifi service and/or has greater than a certain number of followers (e.g., >10K followers), and the like. Subscriber analysis metrics attempt to provide measures that indicate subscriber customer behaviors. For example, subscriber analysis may indicate whether a subscriber performed recent internet searches for an alternate mobile carrier, whether a subscriber is using network operator applications, whether a subscriber searches for a particular item above a threshold (e.g., chronically searches for on-line coupons/discounts), whether a subscriber is a big (i.e., above a threshold) purchaser of network operator sponsored content, subscriber loyalty, subscriber application tendencies (e.g., video? other particular service?), and the like. Wireless service metrics provide measures associated with wireless service usage of a subscriber. For example, wireless service metrics may include subscriber usage/quota information, subscriber calls to Customer Care (e.g., existence, numerosity, content, and the like), subscriber data rates experienced, and the like.

Network analytics provide measures associated with operation of the wireless network. For example, network analytics may include and indicate cell hardware load, signatures on known issues (e.g., Access Point Name (APN) configuration, virus, bad hardware, 3GPP air interface bearer plane loading, etc.), Denial of Service (DoS) Attack/s, adjacent cell air-interface bearer plane loading, unexplained performance degradation/s, per-cell video/audio quality metrics, core network signaling load surge/s, occurrence of major event/s in an area, network element outage/s, Wifi loading, and the like.

Such analytics information may be measured and/or collected from time-to-time in an on-going manner and thus be considered dynamic subscriber analytics and dynamic network analytics. As mentioned above, ANDSF policies may be established based on a combination of subscriber analytics information and the network analytics information. As but one example, a mobile network operator may wish to establish policies that more aggressively pushes to Wifi networks subscribers that stream large amounts of video, while preferentially keeping on the 3GPP network subscribers that have recently complained to customer care about Wifi performance.

In 3GPP R11, the result from considering relevant analytics information inputs to the ANDSF Server is an ANDSF policy which indicates a ranked list of access options. The ANDSF policy may be sent to the UE in the managed object via the S14 interface. The complexity associated with analytics based policy decisions made in the ANDSF server for the construction of the ANDSF policy is not visible to the UE.

3GPP and industry groups like 4G Americas have been looking at mechanisms to dynamically load balance between 3GPP and Wifi. A leading candidate method involves: broadcast/sending of 3GPP cell loading information to the UE; broadcast/sending of a threshold value/s for a signal strength parameter/s to the UE; broadcast/sending of a cell loading threshold to the UE; and the UE thereafter considering itself a candidate for Wifi off-load if its measured signal strength and the received loading cross the received threshold values.

SUMMARY OF EMBODIMENTS

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

As discussed herein, a problem with the above identified leading candidate method and similar solutions for load balancing is that they destroy the value of ANDSF analytics based access selection. An ANDSF policy that details a ranked list of access options based on analytic information is provided to the UE. The complexity associated with analytics based policy decisions made in the ANDSF server is not visible to the UE. Accordingly, subsequent considerations that affect the access selection should be reflected in the policy rules because, without this, the nuances applied in the ANDSF server to differentiate access selection are lost.

For example, if some subscribers have historically been heavy video users and other subscribers have complained to customer care about poor experiences on Wifi, the mobile network operator may wish to differentiate access selection for these two types of subscribers. Accordingly, the mobile network operator may wish to establish the following exemplary policies in the ANDSF server:

serve all users on 3GPP when real-time cell loading is low;
push heavy video users to Wifi when real-time cell loading increases while preferentially keeping Wifi-complainers on 3GPP; and
push Wifi complainers to Wifi only if real-time loading gets heavy.

With the 3GPP R11 ANDSF managed object, support for such a policy is not possible if the criteria for dealing with the loading information are conveyed to the UE outside of the policies sent to the UE by the ANDSF server. As a result, the UE does not have sufficient information to treat the two subscriber types (i.e., heavy video users and Wifi-complainers) differently as a function of loading. Subscriber types may be determined by the ANDF server based on an analysis of subscriber activity, for example comparison of activity levels to established thresholds.

The disclosed subject matter is directed to addressing the effects of one or more of the problems set forth above.

In one embodiment, a method comprises obtaining from an Access Network Discovery and Selection (ANDSF) server an ANDSF policy specifying a rule for access selection, the rule specifying one or more attributes to be compared to a corresponding one or more expressions, at least one of the corresponding one or more expressions being a sum of a corresponding threshold parameter and a corresponding offset parameter; obtaining one or more threshold parameter values; obtaining at least one offset parameter value; and determining the access selection based on the at least one rule, the one or more threshold parameter values, and the at least one offset parameter value.

In one embodiment, the method receives the ANDSF policy at a user equipment (UE).

In one embodiment, the method obtains the one or more threshold parameter values by receiving at a user equipment (UE) the one or more threshold parameter values from the ANDSF server, or receiving at the user equipment (UE) the one or more threshold parameter values from the network loading server.

In one embodiment, the method obtains the at least one offset parameter value by receiving at a user equipment (UE) the at least one offset parameter value from a network loading server, or receiving at the user equipment (UE) the at least one offset parameter value from the ANDSF server.

In one embodiment obtaining the at least one offset parameter value includes determining that the at least one offset parameter value is zero when the at least one offset parameter value is not received from the ANDSF server or a network loading server.

In one embodiment, determining the access selection based on the at least one rule, the one or more threshold parameter values, and the at least one offset parameter value includes determining that a user equipment (UE) should access a WLAN network or a 3GPP network.

In one embodiment, determining the access selection based on the at least one rule, the one or more threshold parameter values, and the at least one offset parameter value includes comparing a measured value for the one or more attributes to the corresponding one or more thresholds with at least one of the corresponding one or more thresholds adjusted by the at least one offset.

In one embodiment, determining the access selection based on the at least one rule, the one or more threshold parameter values, and the at least one offset parameter value includes determining to access a WLAN network or a 3GPP network based on a result of the comparing.

In one embodiment the method may include accessing a WLAN network or a 3GPP network based on the access selection. In another embodiment the method may determine the access selection based on the at least one rule, the one or more threshold parameter values, and the at least one offset parameter value by performing an evaluation of the rule utilizing a measured value for the one or more attributes, the one or more threshold parameter values, and the at least one offset parameter value for the one or more expressions.

An apparatus embodiment may include a processor and a memory communicatively connected to the processor, wherein the processor may be configured to perform any of the methods described above.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
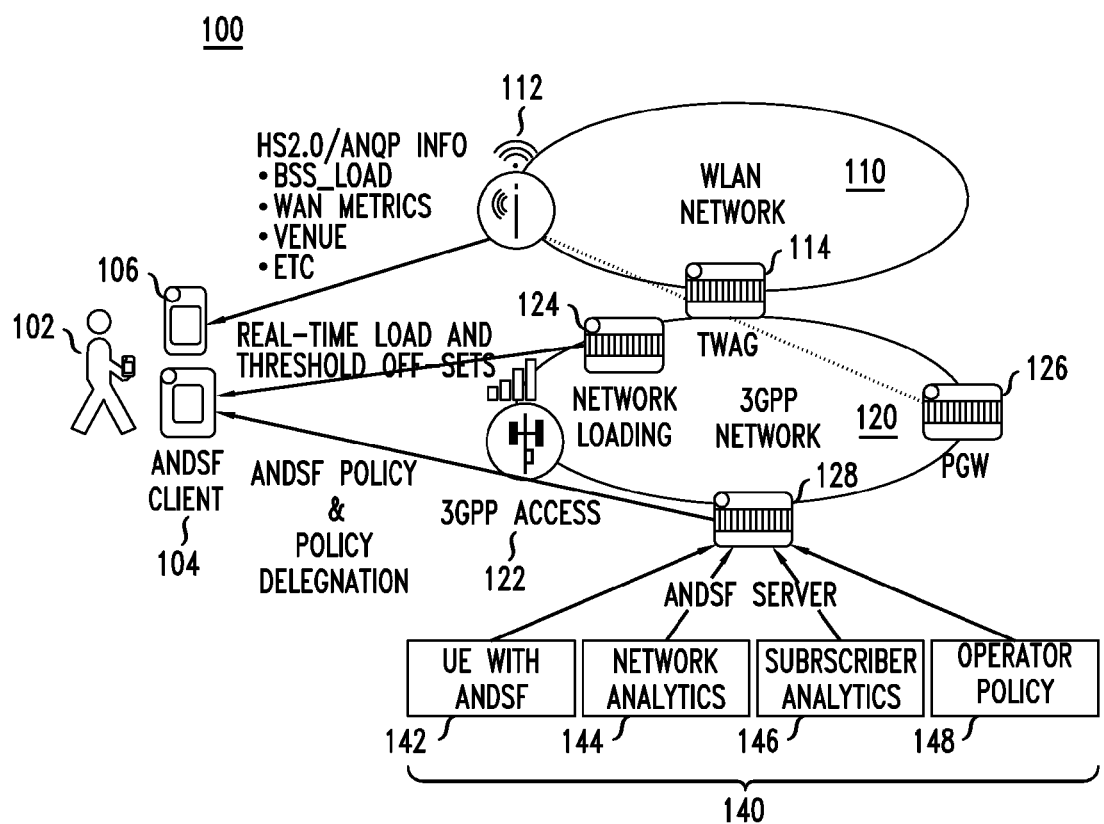
FIG. 1 conceptually illustrates one example embodiment of a wireless communication system according to the principles of the invention.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The description and drawings merely illustrate the principles of the claimed subject matter. It should thus be appreciated that those skilled in the art may be able to devise various arrangements that, although not explicitly described or shown herein, embody the principles described herein and may be included within the scope of the claimed subject matter. Furthermore, all examples recited herein are principally intended to be for pedagogical purposes to aid the reader in understanding the principles of the claimed subject matter and the concepts contributed by the inventor(s) to furthering the art, and are to be construed as being without limitation to such specifically recited examples and conditions.

The disclosed subject matter is described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition is expressly set forth in the specification in a definitional manner that directly and unequivocally provides the special definition for the term or phrase. Additionally, the term, "or," as used herein, refers to a non-exclusive "or," unless otherwise indicated (e.g., "or else" or "or in the alternative"). Also, the various embodiments described herein are not necessarily mutually exclusive, as some embodiments can be combined with one or more other embodiments to form new embodiments.

As discussed herein, provided are methodology and apparatuses for combining longer-term analytics based policy for access selection with dynamic load balancing in a synergistic manner.

FIG. 1 conceptually illustrates one example embodiment of a wireless communication system according to the principles of the invention. The wireless communication system 100 includes a User Equipment (UE) 102, Wireless Local Access Network (WLAN) 110, and Third Generation Partnership Project (3GPP) Network 120.

UE 102 may implement transceivers that include transmitters for transmitting uplink signals towards the WLAN network 110 and 3GPP network 120 (via reverse link) and receivers for receiving downlink signals transmitted by the WLAN and 3GPP networks (via forward link). Toward that end, UE 120 includes ANDSF client 104 for interfacing with the 3GPP network and WLAN client 106 for interfacing with the WLAN network. Communication over the air interface between a UE and the respective networks takes places according to various agreed-upon standards and/or protocols. For example, UE 102 may be a cellular phone, a smart phone, a tablet computer, a laptop computer, or the like. The ANDSF client 104 may utilizes the ANDSF policy and threshold offsets as described herein to determine the access selection.

WLAN 110 includes an access point 112 by which the UE connects with the WLAN network and a Trusted Wireless Access Gateway (TWAG) 114 which routes packets from the WLAN 110 to 3GPP network 120. The typical operation of WLAN 110, access point 112 and TWAG 114, and the interconnection of WLAN elements will be understood by one skilled in the art.

3GPP network 120 includes 3GPP access node 122, network loading server 124, a Packet Data Network (PDN) Gateway (PGW) 126, and Access Network Discovery and Selection (ANDSF) Server 128 which are communicatively interconnected. The 3GPP access node 120 (e.g., NodeB, eNodeB) provides the hardware and functionality for communicating directly between the UE and the 3GPP network. The network loading server 124 provides real time load and threshold offsets based on the loading condition of the network, which offsets are provided to the UE. The PGW 126 provides access from the 3GPP network to a Packet Data Network (PDN) (not shown). The PDN may be any suitable type of packet data network which may be accessible via PGW 126 (e.g., the Internet, one or more private packet networks, or the like, as well as various combinations thereof). The ANDSF server is used to specify policies for UEs on the technology that the UEs should select for service. The conventional operations of 3GPP network 120, and network elements 3GPP access node 122, network loading server 124, a PGW 126, and ANDSF Server 128 will be understood by one skilled in the art.

UE 102 communicates over the air interface to access nodes 112 or base stations 122 according to various agreed-upon standards and/or protocols. The UE may obtain measurements from a variety of sources. For example, the UE 102 may receive Wifi information from access point 112, (e.g., a Hotspot 2.0 compliant access point). Wifi information may include air-interface loading (e.g., BSS_Load), backhaul loading (including WAN metrics), venue data (e.g., residential, public high school, library, etc.), and the like. For instance, the UE 102 may obtain local information from itself (e.g., battery status, upload buffer status, other statuses, etc.) For example, the UE may obtain mobility network information through measurement by the UE (e.g., signal strength and the like), and/or receipt from the mobility network (e.g., broadcast of cell loading and the like).

Persons of ordinary skill in the art having benefit of the present disclosure should appreciate that the standards or protocols are intended to be exemplary and alternative embodiments may use other standards or protocols for supporting communication within the wireless communication system 100.

The ANDSF server 128 formulates an ANDSF policy for off-loading the UE to Wifi based on analytics information from a variety of sources 140. Sources of analytics information may include a UE with ANDSF 142, network analytics 144, subscriber analytics 144, network operator policy 148, and the like. The ANDSF policy sent to the UE is a ranked list of access options with rules stipulating when and where that ranking should be applied. At least one ANDSF policy rule that is based on a threshold of a network loading information parameter is augmented to be additionally based on an offset to that threshold. For example, as detailed and described earlier, analytics may indicate heavy video users and Wifi complainers, for which the network operator may wish to specify different policies for access selection. For dynamic load balancing purposes, the ANDSF policy is defined by one or more rules by which one or more parameters are judged against corresponding threshold/s, which threshold/s may be further adjusted by an offsets. In particular, an ANDSF policy specifies a rule for access selection. The rule specifies one or more attributes to be compared to a corresponding one or more expressions. At least one of the corresponding one or more expressions is a sum of a corresponding threshold parameter and a corresponding offset parameter. For example, an ANDF policy sent for the Wifi complainer could include the rule:

Select 3GPP IF cell_loading<70%+Offset;
Select 3GPP IF 70%+Offset<cell loading<80%+Offset AND Battery<30%;
ELSE select WLAN 1 IF available.

Thus for the Wifi complainer, in the first instance, access selection is based on whether cell loading is above the cell loading threshold (70%) plus an offset to the cell loading threshold. In the first instance, the cell loading attribute is compared to the corresponding expression 70%+offset. The expression is a sum of a corresponding threshold parameter (70%) and the corresponding offset parameter (offset). The rule is obtained as part of the ANDSF policy from the ANDSF server 128. The value of offset to the cell loading threshold is obtained from the network loading server 124. Battery is another attribute and refers to the battery power status of the UE. The battery attribute is compared to the expression 30%. This expression comprises a threshold parameter 30% and does not include an offset parameter.

For the heavy video user, an example ANDSF policy which would treat the heavy video user differently from the Wifi complainer could include the rule:

Select 3GPP IF cell_loading<50%+Offset;
Select 3GPP IF 50%+Offset<cell loading<60%+Offset AND Battery<30%;
ELSE select WLAN 1 IF available.

Thus for the heavy video user, in the first instance, access election is based on whether cell loading is above the cell loading threshold (50%) plus an offset to the cell loading threshold.

The thresholds (e.g., 50%, 70%, 80%, etc.) are specified in the ANDSF policy and differentiated according to the sophisticated analytics. Naturally, a threshold may take any value. Because the thresholds are in policy, they are relatively static. The thresholds enable per-subscriber, per-application or per-flow differentiation. The determination of a conventional ANDSF policy and the establishment of rules for access selection based on comparison of one or more parameters to thresholds are understood by one skilled in the art of the invention. Note that thresholds for load balancing cannot simply be broadcast/sent from the network, independent of the per-UE, per-application or per-flow ANDSF policy without losing the nuances applied by the ANDSF policy to differentiate access selection Accordingly, the provision of dynamic control is still possible by sending/broadcasting offsets instead of thresholds for attributes that require real-time control to be used in conjunction with the thresholds of the ANDSF policy for the subject attributes.

As described herein, conventional ANDSF policy is modified based on one or more offsets that adjust the comparison to a threshold stated by a policy rules. Offsets are sent/broadcast according to dynamic loading information. The offsets may be altered frequently (e.g., on the order of seconds or some longer period) in order to provide network operators with real-time control desirable for load balancing. The offsets can be adjusted based on measured congestion in the 3GPP network For example, the offset can be increased based on congestion in the 3GPP network being above a first predetermined level and/or increasing in magnitude and the offset can be decreased based on congestion in the 3GPP network falling below a second predetermined level and/or decreasing in magnitude.

ANDSF is a tool that mobile network operators can use to control where the subscriber receives service and thus impact the subscriber experience. Additionally, mobile network operators also desperately need to manage their network loading by dynamically balancing traffic between Wifi and 3GPP. The embodiments disclosed herein provide a way for mobile network operators to support both of these imperatives.

Figure 2:
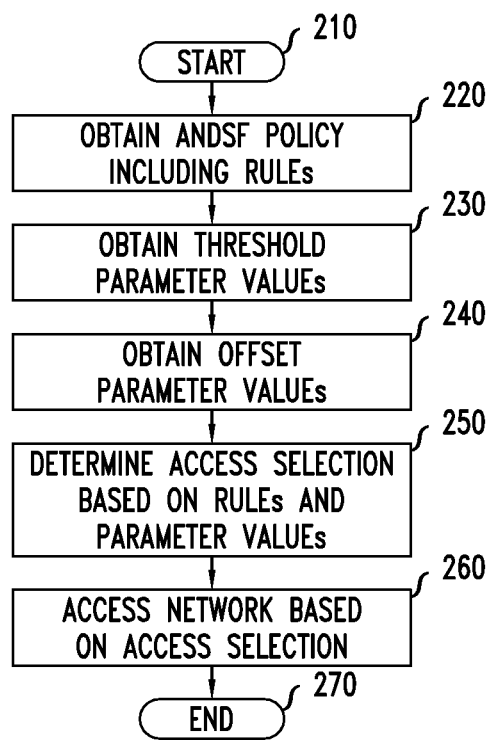
FIG. 2 conceptually illustrates one exemplary embodiment of a method that may be implemented in an apparatus, such as the UE shown in FIG. 1, according to the principles of the invention.

FIG. 2 conceptually illustrates one exemplary embodiment of a method that may be implemented in an apparatus, such as the UE shown in FIG. 1, according to the principles of the invention. The methodology provided is based one or more of the following principles:

measurements (e.g., BSS_Load, Battery Status, Cell Loading, etc.) may come from one or more sources and can change dynamically;

ANDSF policy specifies parameters and thresholds for measurements obtained and details that at least one threshold is to be offset when making a policy decision. These parameters and thresholds help specify when the UE selects Wifi access as opposed to 3GPP access;

offsets for the specified ANDSF policy may be sent dynamically (via broadcast or unicast) to further support Wifi vs 3GPP load balancing. Note that if no offset is sent and/or received, load balancing will occur about the ANDSF supplied threshold (for example, a default value for the offset (e.g., 0) in the expression of the ANDSF policy rule can be utilized).

processing of the measurements against parameters/thresholds may occur in the ANDSF server or UE, depending on the particular embodiment according to the principles of the invention. For example, the network loading server 124 is depicted in FIG. 1 as a stand-alone entity that can communicate with the UE 102 over the 3GPP network 120 and via base station 122. However, persons of ordinary skill in the art having benefit of the present disclosure should appreciate that the network loading server 124 may be deployed in different locations or in a distributed fashion at multiple locations in alternative embodiments of the wireless communication system 100. For example, embodiments of the network loading server 124 may be implemented in a 3GPP access node 122, in an ANDSF server 128 or at other locations within the 3GPP network 120.

At 210, the method starts.

In operation 220, an ANDSF policy is obtained. The ANDSF policy is obtained from an Access Network Discovery and Selection (ANDSF) server. The ANDSF policy specifies a rule for access selection. The rule specifies one or more attributes to be compared to a corresponding one or more expressions, at least one of the corresponding one or more expressions being a sum of a corresponding threshold parameter and a corresponding offset parameter. Other of the expressions comprising a rule may consist of only a corresponding threshold parameter. For example, the ANDSF policy obtained may detail SELECT 3GPP IF cell_loading<cell load threshold#1+offset#1 for cell load threshold; SELECT 3GPP IF cell load threshold#1+offset#1 for cell load threshold<cell loading<cell load threshold#2+offset#2 for cell load threshold AND Battery<battery threshold; ELSE SELECT WLAN 1 IF available.

In operation 230, one or more threshold parameter values are obtained. For example, the values for cell load threshold#1, cell load threshold#2, and battery threshold may be obtained. Threshold parameter values may also be obtained in conjunction with obtaining the ANDSF policy. For example, the obtained ANDSF policy may detail SELECT 3GPP IF cell_loading<70%+offset#1 for cell load threshold; SELECT 3GPP IF 70%+offset#1 for cell load threshold<cell loading<80%+offset#2 for cell load threshold AND Battery<30%; ELSE SELECT WLAN 1 IF available.

In operation 240, at least one offset parameter value is obtained. One of the threshold parameter values and the offset parameter value is received from the ANDSF server. The other of threshold parameter value and the offset parameter value is received from the network loading server. In other word, which parameter value is nominally called the threshold and which is nominally called the offset is not material to the principles of the invention.

In operation 250, the access selection is determined based on the at least one rule, the one or more threshold parameter values, and the at least one offset parameter value as described above.

In operation 260, a network is accessed based on the access selection that is determined. For example, the UE may access the Wifi network or the 3GPP network based on the ANDSF policy decision.

At 270 the method ends.

Figure 3:
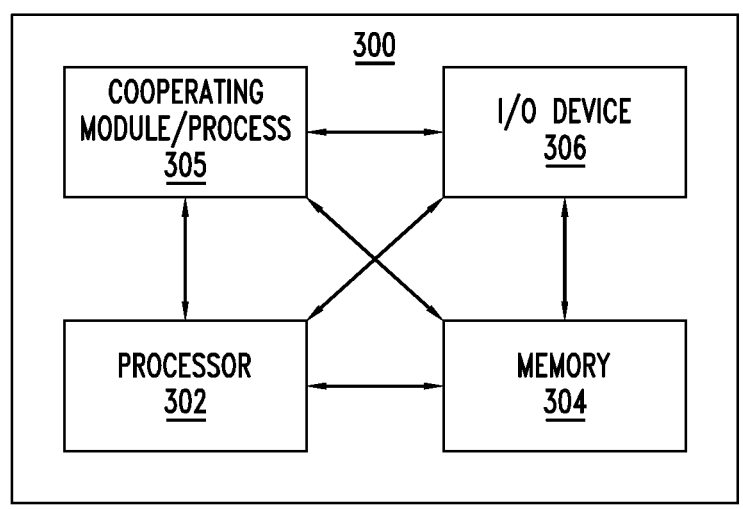
FIG. 3 depicts a high-level block diagram of a computer suitable for use in performing functions described herein.

FIG. 3 depicts a high-level block diagram of a computer suitable for use in performing functions described herein. The computer 300 includes a processor 302 (e.g., a central processing unit (CPU) or other suitable processor(s)) and a memory 304 (e.g., random access memory (RAM), read only memory (ROM), and the like).

The computer 300 also may include a cooperating module/process 305. The cooperating process 305 can be loaded into memory 304 and executed by the processor 302 to implement functions as discussed herein and, thus, cooperating process 305 (including associated data structures) can be stored on a computer readable storage medium, e.g., RAM memory, magnetic or optical drive or diskette, and the like.

The computer 300 also may include one or more input/output devices 306 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 300 depicted in FIG. 3 provides a general architecture and functionality suitable for implementing functional elements described herein or portions of functional elements described herein. For example, the computer 300 provides a general architecture and functionality suitable for implementing one or more of UE 102, access point 112, TWAG 110, 3GPP access node 122, network loading server 124, PGW 126 and ANDSF server 128, one or more elements of WLAN 110, one or more elements of 3GPP network 120, or the like.

The methodology and apparatuses provided herein allow for analytics based, subscriber, application and flow differentiated WLAN off-load policy, while at the same time allowing dynamic load balancing.

It will be appreciated that the functions depicted and described herein may be implemented in hardware or a combination of software and hardware, e.g., using a general purpose computer, via execution of software on a general purpose computer so as to provide a special purpose computer, using one or more application specific integrated circuits (ASICs) or any other hardware equivalents, or the like, as well as various combinations thereof.

It will be appreciated that at least some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods or techniques described herein are invoked or otherwise provided. Instructions for invoking the inventive methods may be stored in fixed or removable media, transmitted via a data stream in a broadcast or other signal bearing medium, or stored within a memory within a computing device operating according to the instructions.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of storage medium or implemented over some type of transmission medium. The storage medium, such as a non-transitory storage medium, may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method comprising:
obtaining from an Access Network Discovery and Selection (ANDSF) server an ANDSF policy specifying a rule for access selection, the rule specifying one or more attributes to be compared to a corresponding one or more expressions, at least one of the corresponding one or more expressions being a sum of a corresponding threshold parameter and a corresponding offset parameter;

obtaining one or more threshold parameter values, wherein obtaining the one or more threshold parameter values comprises receiving at a user equipment (UE) the one or more threshold parameter values from the ANDSF server;

obtaining at least one offset parameter value more frequently than obtaining the one or more threshold parameter values, wherein obtaining the at least one offset parameter value comprises receiving at the user equipment (UE) the at least one offset parameter value from a network loading server; and determining the access selection based on the at least one rule, the one or more threshold parameter values, and the at least one offset parameter value.

2. The method of claim 1 wherein obtaining the at least one offset parameter value comprises altering the at least one offset parameter value while the one or more threshold parameter values remain static.

3. The method of claim 1 wherein obtaining the one or more threshold parameter values comprises:
receiving at the user equipment (UE) the one or more threshold parameter values from the ANDSF server, or
receiving at the user equipment (UE) the one or more threshold parameter values from the network loading server.

4. The method of claim 1 wherein obtaining the at least one offset parameter value comprises:
determining that the at least one offset parameter value is zero when the at least one offset parameter value is not received from the ANDSF server or the network loading server.

5. The method of claim 1 wherein determining the access selection based on the at least one rule, the one or more threshold parameter values, and the at least one offset parameter value comprises:
determining that the user equipment (UE) should access a WLAN network or a 3GPP network.

6. The method of claim 1 wherein determining the access selection based on the at least one rule, the one or more threshold parameter values, and the at least one offset parameter value comprises:
comparing a measured value for the one or more attributes to the corresponding one or more thresholds with at least one of the corresponding one or more thresholds adjusted by the at least one offset.

7. The method of claim 6 wherein determining the access selection based on the at least one rule, the one or more threshold parameter values, and the at least one offset parameter value comprises:
determining to access a WLAN network or a 3GPP network based on a result of the comparing.

8. The method of claim 1 further comprising, accessing a WLAN network or a 3GPP network based on the access selection.

9. The method of claim 1 wherein determining the access selection based on the at least one rule, the one or more threshold parameter values, and the at least one offset parameter value comprises:

performing an evaluation of the rule utilizing a measured value for the one or more attributes, the one or more threshold parameter values, and the at least one offset parameter value for the one or more expressions.

10. The method of claim 1, wherein obtaining the at least one offset parameter value comprises obtaining at least one offset parameter value that has been altered in response to changes in network congestion.

11. An apparatus comprising:
a processor and a memory communicatively connected to the processor, the processor configured to:
obtain from an Access Network Discovery and Selection (ANDSF) server an ANDSF policy specifying a rule for access selection, the rule specifying one or more attributes to be compared to a corresponding one or more expressions, at least one of the corresponding one or more expressions being a sum of a corresponding threshold parameter and a corresponding offset parameter;
obtain one or more threshold parameter values, wherein the processor is configured to receive the one or more threshold parameter values from the ANDSF server;
obtain at least one offset parameter value more frequently than obtaining the one or more threshold parameter values, wherein the processor is configured to receive the at least one offset parameter value from a network loading server; and
determine the access selection based on the at least one rule, the one or more threshold parameter values, and the at least one offset parameter value.

12. The apparatus of claim 11 wherein the processor is configured to alter the at least one offset parameter value while the one or more threshold parameter values remain static.

13. The apparatus of claim 11 wherein the processor is configured to determine that the at least one offset parameter value is zero when the at least one offset parameter value is not received from the network loading server.

14. The apparatus of claim 11 wherein the processor is configured to determine access should be via a WLAN network or a 3GPP network.

15. The apparatus of claim 11 wherein the processor is configured to compare a measured value for the one or more attributes to the corresponding one or more thresholds with at least one of the corresponding one or more thresholds adjusted by the at least one offset.

16. The apparatus of claim 15 wherein the processor is configured to determine to access a WLAN network or a 3GPP network based on a result of comparing the measured value.

17. The apparatus of claim 11 wherein the processor is configured to access a WLAN network or a 3GPP network based on the access selection.

18. The apparatus of claim 11 wherein the processor is configured to perform an evaluation of the rule utilizing a measured value for the one or more attributes, the one or more threshold parameter values, and the at least one offset parameter value for the one or more expressions.

19. The apparatus of claim 11, wherein the processor is configured to obtain at least one offset parameter value that has been altered in response to changes in network congestion.

* * * * *